US011588750B1

(12) United States Patent
Gazzetti et al.

(10) Patent No.: US 11,588,750 B1
(45) Date of Patent: Feb. 21, 2023

(54) DYNAMIC ORCHESTRATION OF DISAGGREGATED RESOURCES

(71) Applicant: INTERNATIONAL BUSINESS MACHINES CORPORATION, Armonk, NY (US)

(72) Inventors: Michele Gazzetti, Dublin (IE); Panagiotis Koutsovasilis, Dublin (IE); Christian Pinto, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/447,911

(22) Filed: Sep. 16, 2021

(51) Int. Cl.
| | | |
|---|---|---|
| *H04L 67/63* | (2022.01) | |
| *H04L 67/75* | (2022.01) | |
| *H04L 67/00* | (2022.01) | |
| *H04L 47/78* | (2022.01) | |
| *G06N 20/00* | (2019.01) | |
| *H04L 67/1097* | (2022.01) | |
| *H04L 47/762* | (2022.01) | |

(52) U.S. Cl.
CPC ........... *H04L 47/781* (2013.01); *G06N 20/00* (2019.01); *H04L 47/762* (2013.01); *H04L 67/1097* (2013.01)

(58) Field of Classification Search
CPC . H04L 47/781; H04L 47/762; H04L 67/1095; G06N 20/00
USPC ........................................................ 709/226
See application file for complete search history.

(56) References Cited

U.S. PATENT DOCUMENTS

| | | | |
|---|---|---|---|
| 8,291,148 B1 | 10/2012 | Shah et al. | |
| 10,063,493 B2 | 8/2018 | Li et al. | |
| 10,102,035 B2 | 10/2018 | Bartfai-Walcott et al. | |
| 10,205,675 B2 | 2/2019 | Chen et al. | |
| 10,969,975 B2 | 4/2021 | Bernat et al. | |
| 11,012,423 B2 | 5/2021 | Li et al. | |
| 2004/0181476 A1 | 9/2004 | Smith et al. | |
| 2012/0047239 A1* | 2/2012 | Donahue | G06F 9/5072 709/220 |
| 2014/0007097 A1 | 1/2014 | Chin et al. | |
| 2014/0068599 A1* | 3/2014 | Kannan | G06F 9/5066 718/1 |
| 2015/0264127 A1* | 9/2015 | Riedy | H04L 41/5022 709/226 |
| 2017/0295107 A1 | 10/2017 | Salapura et al. | |
| 2018/0150343 A1* | 5/2018 | Bernat | H04L 41/0816 |
| 2019/0065256 A1 | 2/2019 | Hamilton et al. | |

(Continued)

OTHER PUBLICATIONS

Bill Dawkins, "Server Disaggregation: Sometimes the Sum of the Parts is Greater Than the Whole", Nov. 20, 2017, Dell, https://www.dell.com/en-us/blog/server-disaggregation-sometimes-the-sum-of-the-parts-is-greater-than-the-whole/ (Year: 2017).*

(Continued)

*Primary Examiner* — Ruolei Zong
(74) *Attorney, Agent, or Firm* — Griffiths & Seaton PLLC

(57) ABSTRACT

A request may be identified having one or more constraints for accessing disaggregated resources in a computing environment. One or more resources in a plurality of disaggregated resources may be identified based on the request. Computing server instances may be dynamically orchestrated using the one or more resources in the plurality of disaggregated resources based on the one or more constraints.

20 Claims, 11 Drawing Sheets

(56) References Cited

U.S. PATENT DOCUMENTS

| | | | |
|---|---|---|---|
| 2019/0147364 A1* | 5/2019 | Alt | G06N 20/10 |
| | | | 706/12 |
| 2020/0007460 A1* | 1/2020 | Guim Bernat | G06F 9/5072 |
| 2020/0073724 A1* | 3/2020 | Turull | G06F 9/5077 |
| 2020/0099586 A1* | 3/2020 | Li | G06F 9/5077 |
| 2020/0099592 A1* | 3/2020 | Mahindru | H04L 41/40 |
| 2020/0249999 A1 | 8/2020 | Golway et al. | |
| 2022/0038388 A1* | 2/2022 | Guim Bernat | H04L 47/765 |

OTHER PUBLICATIONS

Peter X. Gao et al., "Network Requirements for Resource Disaggregation", May 2021, Cornell Univ., https://web.archive.org/web/20210511065419/http://www.cs.cornell.edu/~ragarwal/pubs/disaggregation.pdf (Year: 2021).*

IBM Research Editorial Staff, "Advancing cloud with memory disaggregation", Jan. 14, 2018, IBM Research-Ireland, https://www.ibm.com/blogs/research/2018/01/advancing-cloud-memory-disaggregation/ (Year: 2018).*

* cited by examiner

DYNAMIC ORCHESTRATION OF DISAGGREGATED RESOURCES

BACKGROUND

The present invention relates in general to computing systems, and more particularly, to various embodiments for dynamic orchestration of disaggregated resource in a computing environment using a computing processor.

SUMMARY

According to an embodiment of the present invention, a method for increasing disaggregated resources efficiency in a computing environment, by one or more processors, is depicted. A request may be identified having one or more constraints for accessing disaggregated resources in a computing environment. One or more resources in a plurality of disaggregated resources may be identified based on the request. Computing server instances may be dynamically orchestrated using the one or more resources in the plurality of disaggregated resources based on the one or more constraints.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments for automated evaluation of robustness of machine learning models under adaptive whitebox adversarial operation are provided.

DETAILED DESCRIPTION OF THE DRAWINGS

Figure 1:
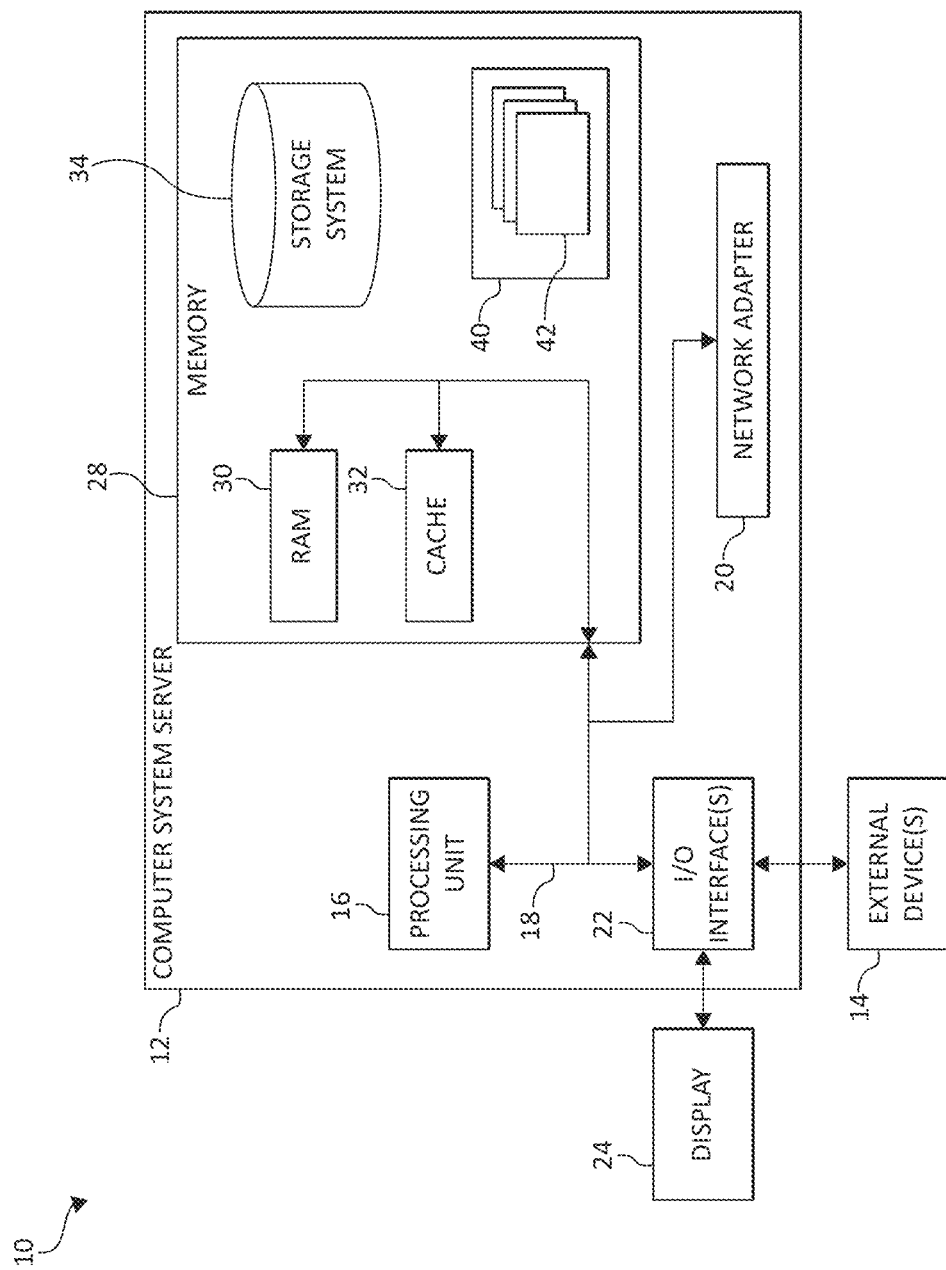
FIG. 1 is a block diagram depicting an exemplary cloud computing node according to an embodiment of the present invention.

The present invention relates generally to the field of data storage, and more specifically, to dynamic orchestration of disaggregated resource in a computing environment and the like.

A well-known information technology (IT) delivery model is cloud computing, by which shared resources, software and information are provided over the Internet to computers and other devices on-demand. Cloud computing significantly reduces IT costs and complexities while improving workload optimization and service delivery. With this approach, an application instance is hosted and made available from Internet-based resources that are accessible, e.g., through a conventional Web browser over HTTP. Cloud compute resources typically are housed in large server farms that run one or more network applications, typically using a virtualized architecture wherein applications run inside virtual servers, or so-called "virtual machines" (VMs), that are mapped onto physical servers in a data center facility.

Within the data center itself, a data center network typically is architected according to a hierarchical design comprising several layers of electrical switches, namely, access, aggregate, and core layers. At a front end of the data center, content and load balancing switches are connected to the Internet through gateway routers, while at the back end, they are linked to core switches. Typically, the core switches are linked to aggregate switches, and the aggregate switches are connected to rack switches. Each rack switch is connected to the servers in the rack. The switches in the data center network operate usually over an electronic switch fabric, and the links between them either are copper cables or optical fibers. Additionally, each rack contains multiple server trays that define a physical unit of resource allocation. Moreover, the resources assigned to each tray are set at design time.

Disaggregation is a technique, for example, where similar types of computer resources in the data center are aggregated in respective pools, such as a compute pool, a memory pool, and a storage pool. A server is then constructed dynamically by allocating from the pools appropriate amounts of resources to meet the requirements of a tenant's workload. A disaggregated server approach provides higher resource utilization as compared to conventional data center architectures, as given components can be used, re-used, or shared among different tenants and processing components.

Disaggregation allows for going beyond the physical boundaries of a tray and reason about resources in terms of compute, memory, storage, or accelerator units. Much effort has been put in defining the mechanisms to connect disaggregated resources between each other to create a dynamically composed server. That said, going beyond the single instance and reasoning at datacenter level, a need exists for a solution capable of orchestrating a global pool of resources and connect them via multi-hop links such as, for example, switches and network connections.

Accordingly, various implementations are provided for increasing disaggregated resources efficiency in a computing environment, by one or more processors, is depicted. In one aspect, a request may be identified having one or more constraints for accessing disaggregated resources in a computing environment. One or more resources in a plurality of disaggregated resources may be identified based on the request. Computing server instances may be dynamically orchestrated using the one or more resources in the plurality of disaggregated resources based on the one or more constraints.

In additional implementations, the present disclosure provides for orchestrating disaggregated pools of resources at a datacenter level using disaggregation to provide dynamically select and compose computing instances comprising computational units, memory units, storage units, and accelerator units. Specifically, using an abstracted representation of the compute resource units and network links available at the infrastructure level, one or more disaggregated resources and connections of a dynamically composed server instance may be selected and used based on input requirements. Additionally, data may be monitored and collected for learning how to improve the composition of disaggregated servers.

In various implementations, a resource database may be provided and implemented as a graph database (such as Janus Graph) that maintains each computer resource as a vertex of the graph and the fabric links represent the edges. Using the operations of step 2B, as described herein, the static allocator 514 identifies a maximum set of resources (e.g., a best set of resources) that can serve the current request and generates configuration for composition fabric and navigates the graph identifying possible connections between the resources. A historical database could be implemented as a time series database ("DB") (such as Influx DB) where a time series is collected for each resource utilization, fabric link utilization etc. An instances and SLO database may be used as a document database (e.g., a Couch database) where each server configuration and its SLOs are stored in a JSON file.

A smart composer may select one or more may compute resources and generate the configuration for a new server by fetching the list of available (not allocated) resources for each resource pool and filter out of computing resources that do not provide the performance meeting the SLOs specified by the user. For example, only memory backends offering less than 1000 nanoseconds latency may be required. As part of the previous step, performance data related to each pool of resources may be accessed, retrieved, and analyzed from a timeseries database containing the historical performance data. Based on this data, a smart composer can define a model to predict future performance using linear regression or a similar techniques. Based on a list of remaining resources coming from the filtering step, a smart composer could fetch from the resource database all sub-graphs of resources that can be physically connected and still meet the user requirements. This step may discard resources lacking enough paths to connect to the rest of the required resources. The remaining sub-graphs may identify a subsets of resources that can be composed together while meeting the user requirements.

The choices taken in the previous steps could evaluated by monitoring the performance metrics for the newly defined server instance. This data can be found in the historical database and the difference between the target and measured performance could be used to train a reinforcement learning model to improve the decision-making ability of the smart composer. A composition agent, network fabric and actual composable resources could be implemented using a particular hardware/software prototype offering full support for memory composition, and the resource pool be represented by a server exposing its memory for pooling and remote access. Resources such as, for example, accelerators, network devices and storage units, can be set-up by enabling connections to PCI switches belonging to the network fabric. The monitoring system could be any of the existing cluster monitoring frameworks.

In other implementations, the present invention dynamically composes and scale server instances by using disaggregated resources, based on user-defined constraints and the current network topology. Optionally, using resource utilization of running server instances to drive the orchestration of resources.

Resource Database maintains a representation of the resources and composable fabric links available in a data center. A historical data database for storing data on resources usage and network fabric utilization. A historical data database may be used to store a representation for server instances and SLOs/SLAs. A smart composer may select the best fabric configuration and set of resources (compute, memory, disk, and accelerator) to compose a new server resources and create a server instance based on user input requirements. A connection manager may be used to configure the composition fabric for establishing the connection between each resource belonging to a selected server instance. A composition agent governs a pool of local resources and connecting them at need.

In one aspect, the smart composer may include a static and/or dynamic allocator for handling new composition requests as well as dynamic reconfiguration of existing servers. Machine learning techniques, any other data manipulation, and forecasting technique on historical resources and fabric usage for finding the best set resources and fabric links to compose a new server request of a re-composition. A smart composer may be used to select or use SLOs/SLAs and/or performance metrics to drive decisions on scaling and composability of server instances. The machine learning component may collect feedback, preferences, or inputs from system administrators and/or end users for learning purposes or setup of customized preferences.

In general, as used herein, "optimize" may refer to and/or defined as "maximize," "minimize," "best," or attain one or more specific targets, objectives, goals, or intentions. Optimize may also refer to maximizing a benefit to a user (e.g., maximize a trained machine learning pipeline/model benefit). Optimize may also refer to making the most effective or functional use of a situation, opportunity, or resource.

Additionally, optimizing need not refer to a best solution or result but may refer to a solution or result that "is good enough" for a particular application, for example. In some implementations, an objective is to suggest a "best" combination of operations and/or machine learning models/ machine learning pipelines, but there may be a variety of factors that may result in alternate suggestion of a combination of operations and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
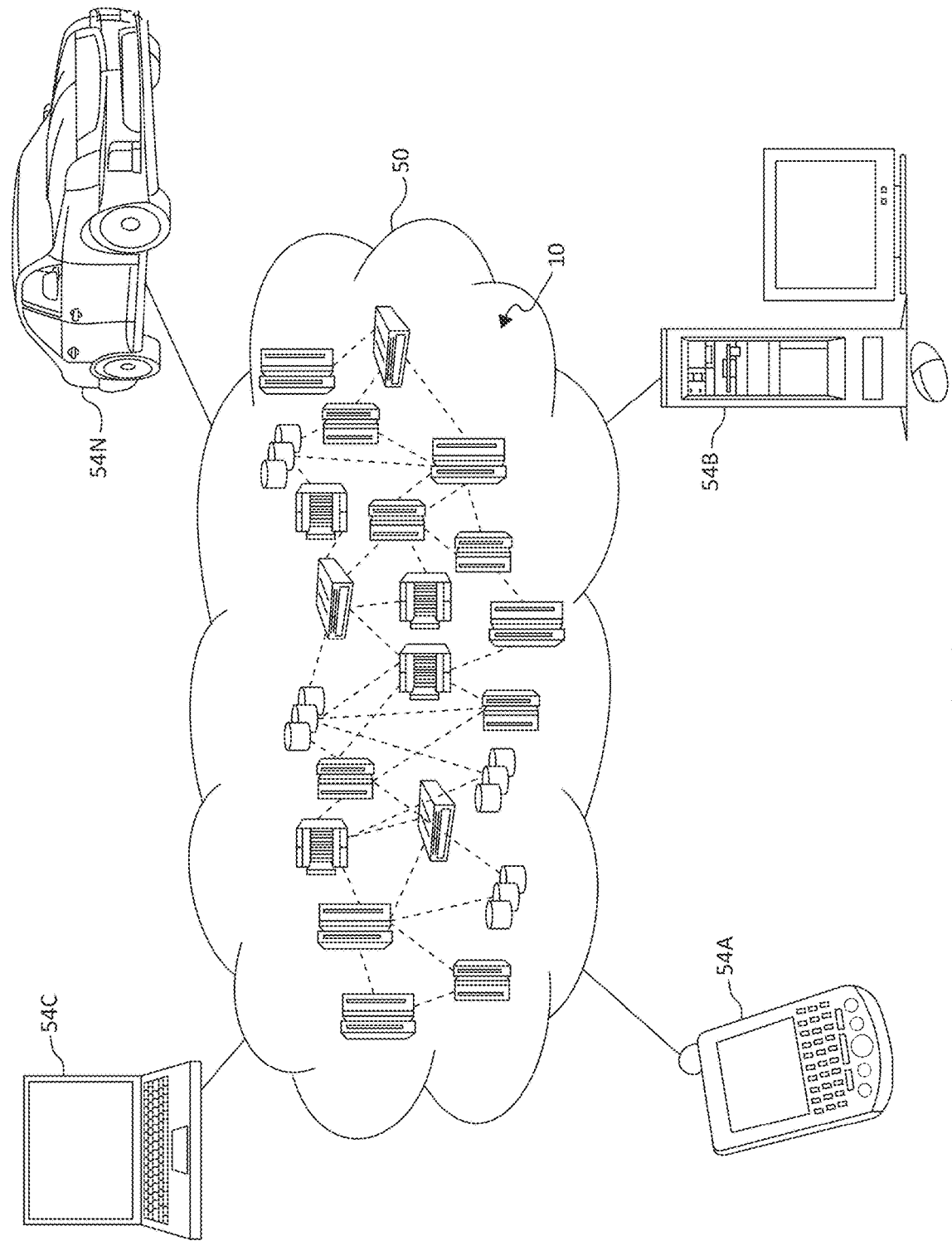
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
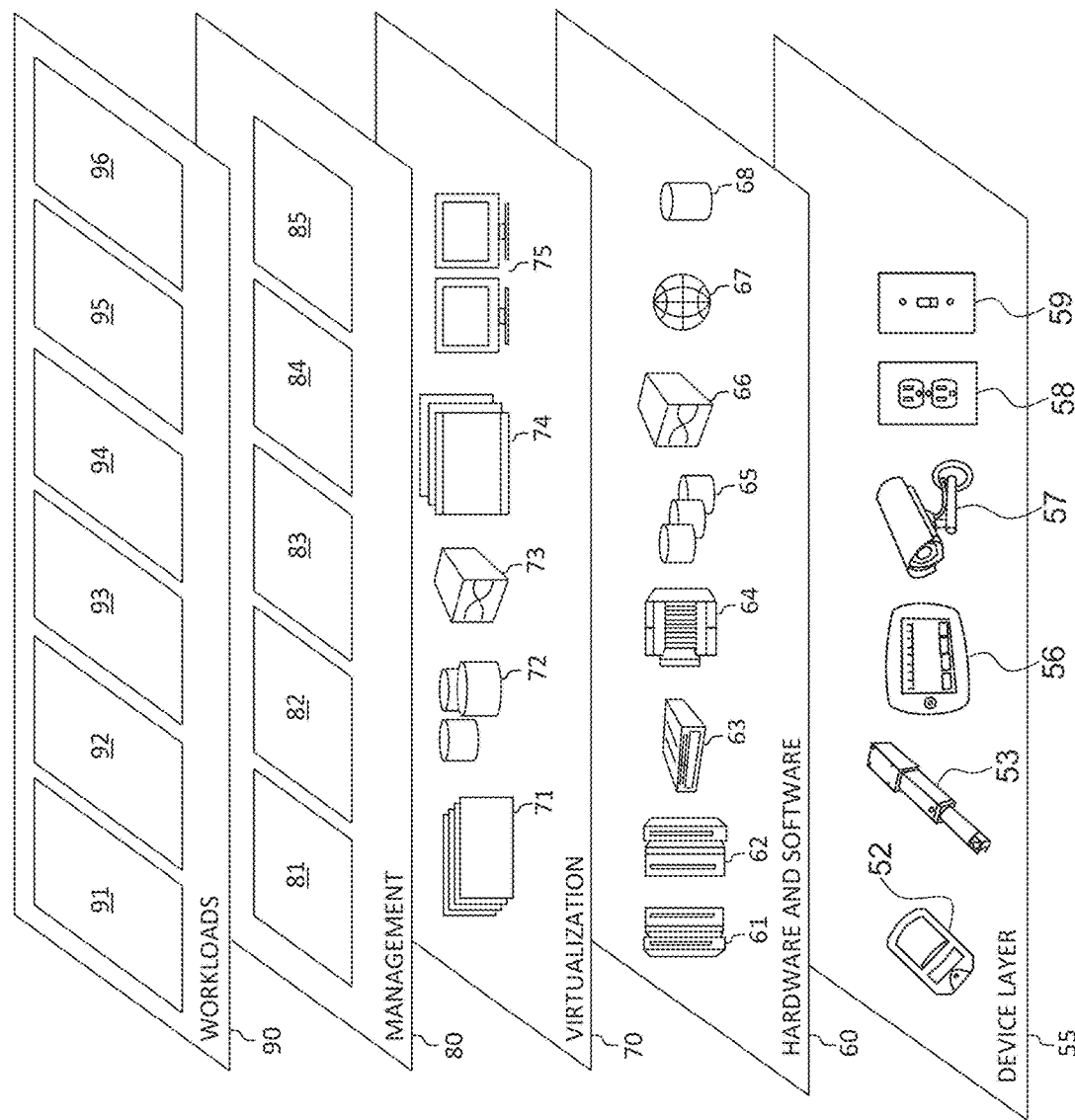
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for dynamic orchestration of disaggregated resource in a computing environment in a computing environment (e.g., in a neural network architecture). In addition, workloads and functions 96 for dynamic orchestration of disaggregated resource in a computing environment in a computing environment may include such operations as analytics, deep learning, and as will be further described, user and device management functions. One of ordinary skill in the art will appreciate that the workloads and functions 96 for dynamic orchestration of disaggregated resource in a computing environment in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the present invention provides novel solutions for increasing disaggregated resources efficiency in a computing environment, by one or more processors, is depicted. A request may be identified having one or more constraints for accessing disaggregated resources in a computing environment. One or more resources in a plurality of disaggregated resources may be identified based on the request. Computing server instances may be dynamically orchestrated using the one or more resources in the plurality of disaggregated resources based on the one or more constraints.

Figure 4:
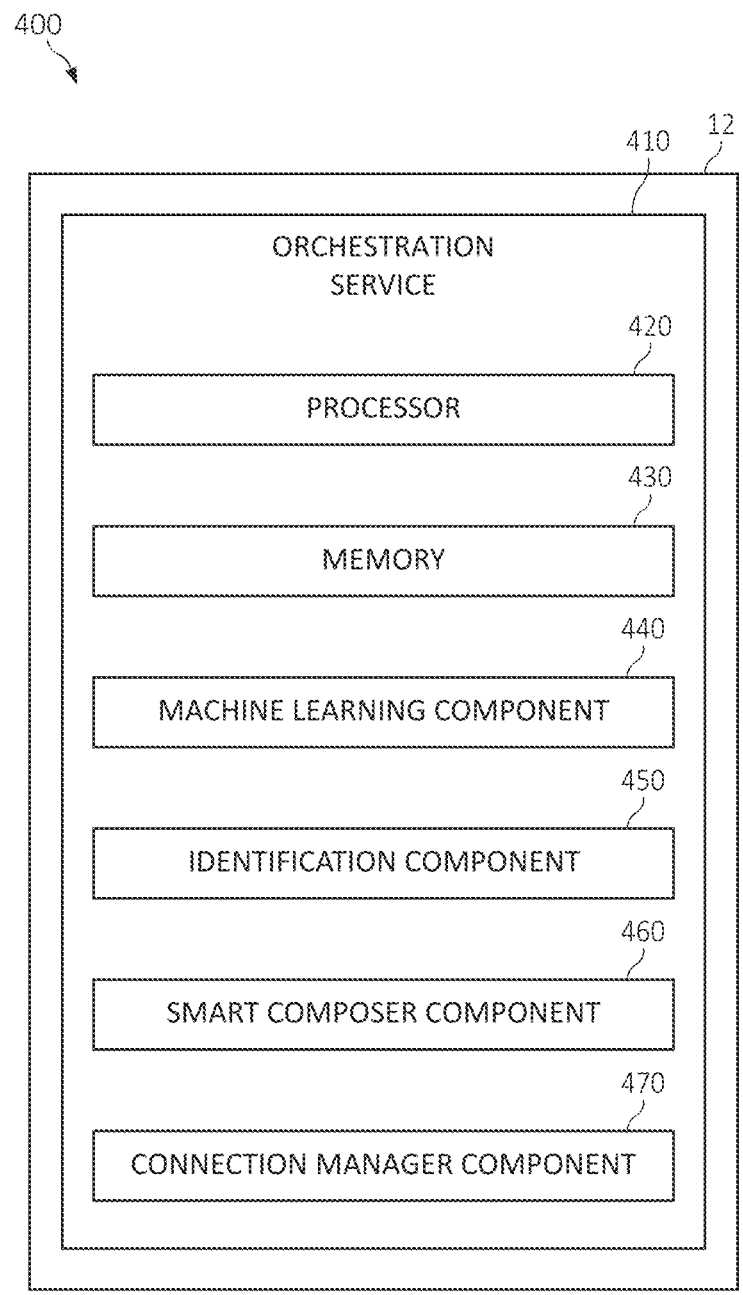
FIG. 4 is an additional block diagram depicting an exemplary functional relationship between various aspects of the present invention.

Turning now to FIG. 4, is a block diagram depicting exemplary functional components of system 400 for dynamic orchestration of disaggregated resource in a computing environment according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

An orchestration service 410 (e.g., dynamic scheduling agent) is shown, incorporating processing unit 420 ("processor") to perform various computational, data processing and other functionality in accordance with various aspects of the present invention. In one aspect, the processor 420 and memory 430 may be internal and/or external to the orchestration service 410, and internal and/or external to the computing system/server 12. The orchestration service 410 may be included and/or external to the computer system/server 12, as described in FIG. 1. The processing unit 420 may be in communication with the memory 430. The orchestration service 410 may include a machine learning component 440, an identification component 450, a smart composer component 460, and a connection manager component 470.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

In one aspect, the orchestration service 410 may, using the machine learning component 440, the identification component 450, the smart composer component 460, and the connection manager component 470 may identify a request having the one or more constraints, identify of one or more resources in the plurality of disaggregated resources based on the request, and dynamically orchestrate one or more server instances using one or more resources in a plurality of disaggregated resources based on one or more constraints.

The smart composer component 460 may recommend the one or more server instances using one or more resources in the plurality of disaggregated resources based on one or more constraints, where the one or more server instances include graphics processing units (GPUs), memory devices, storage systems, and accelerator processor unit (ACUs).

The machine learning component 440 may be initiated to monitor and collect feedback data relating to each of the one or more resources in the plurality of disaggregated resources based on one or more constraints. The smart composer component 460 may dynamically select alternative server instances using the one or more resources in the plurality of disaggregated resources based on machine learning models.

The connection manager component 460 may configure one or more connections and network components between the plurality of disaggregated resources based on dynamically orchestrating the one or more server instances.

In one aspect, the orchestration service 410 may, using the machine learning component 440, the identification component 450, the smart composer component 460, and the connection manager component 470 may identify current resource data and historical resource data of the plurality of disaggregated resources, and dynamically select the one or more server instances using the one or more resources in the plurality of disaggregated resources based on the one or more constraints, the current resource data, and the historical resource data.

In one aspect, the machine learning component 440 as described herein, may perform various machine learning operations using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

For further explanation, FIGS. 5A-5F are block diagrams depicting exemplary functional components of system 500 for dynamic orchestration of disaggregated resource in a computing environment according to various mechanisms of the illustrated embodiments is shown. In one aspect, one or more of the components, modules, services, applications, and/or functions described in FIGS. 1-3 may be used in FIG. 5. As will be seen, many of the functional blocks may also be considered "modules" or "components" of functionality, in the same descriptive sense as has been previously described in FIGS. 1-4.

Figure 5A:
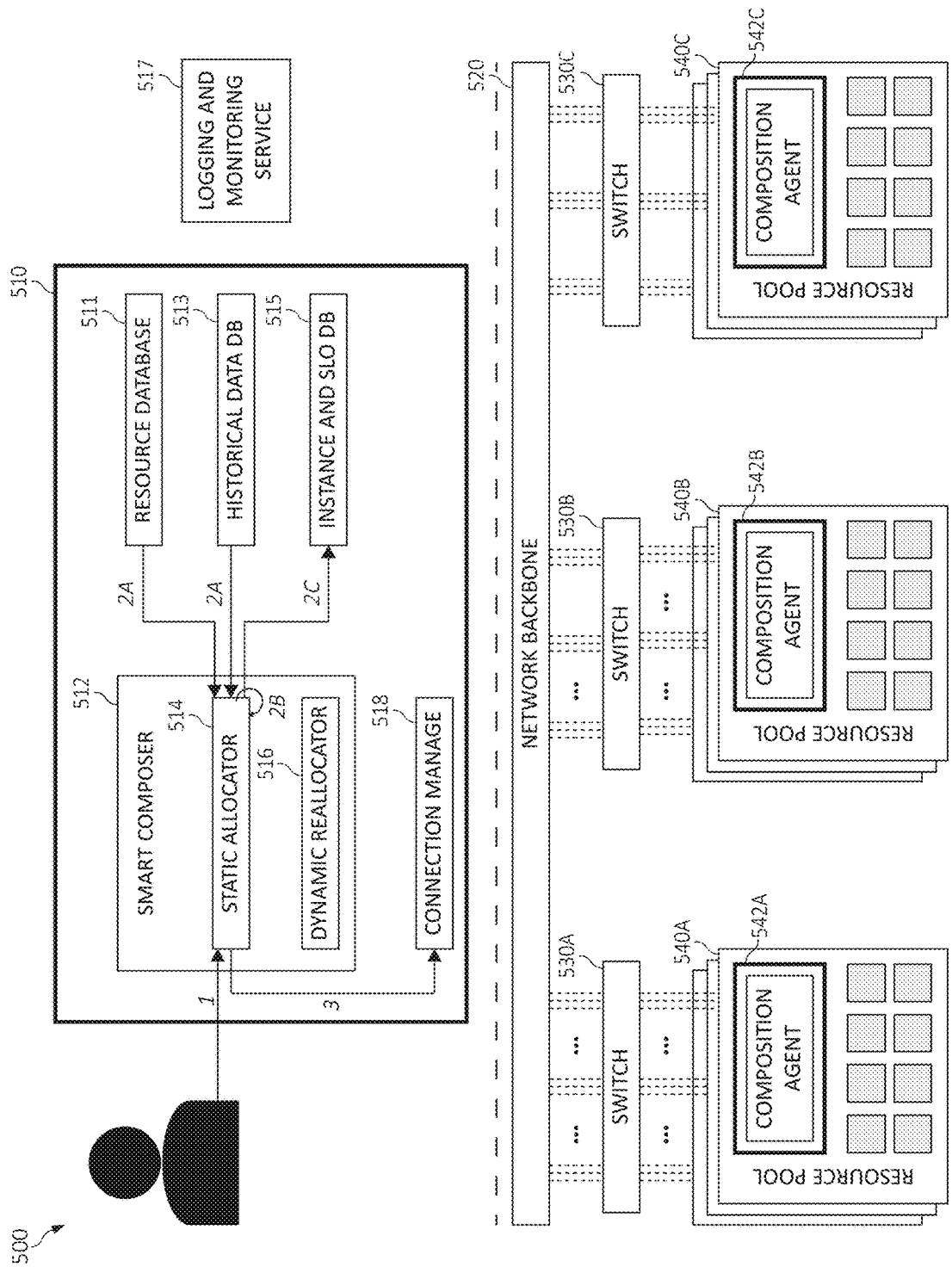
FIGS. 5A-5F depict block flow diagrams depicting operations for dynamic orchestration of disaggregated resource in a computing environment in a computing environment according to an embodiment of the present invention.

Turning now to FIG. 5A, system 500 includes a dynamic orchestration service 510 in communication with a network 520, one or more switches 530A-C, and one or more computer resources such as, for example, resource pools 540A-C. Each of the resource pools 540A-C may include a composition agent such as, for example, composition agent 542A-C.

The dynamic orchestration service 510 includes smart composer 512 that includes a static allocator 514 and a dynamic reallocator 516. The dynamic orchestration service 510 includes a resource database 511, a historical database 512, an instance and SLO database ("DB") 515, and a connection manager 518. The dynamic orchestration service 510 may also be in communication with a logging and monitoring service 517.

The smart composer 512 is a component that orchestrates resources to provide maximum demand and utilization such as, for example, an optimal or best fit demand and utilization. The static allocator 514 provides for allocating and/or composing new or additional servers and selects one or more of the computer resources (e.g., an optimal or best computer resource) that matches and achieves one or more user requirements (e.g., initial requirements in a request). The dynamic reallocator 516 continuously monitors and analyzes the state of one or more servers and evaluates one or more target metrics such as, for example, service level objectives ("SLOs"), resource utilization, power management, etc. The dynamic reallocator 516 can increase or decreases resources available to a server based on the server's current ability to meet the target performance metrics. The static allocator 514 and the dynamic reallocator 516 may both access and use historical data from the historical database 513 for driving composition decisions.

The connection manager 518 is responsible for issuing configuration requests to the network 520 (e.g., a network fabric) with the goal of connecting disaggregated resources.

The composition agent such as, for example, the composition agents 542A-C may set up, configure, and/or provide local fabric connections for enabling remote access to locally managed resources such as, for example, the resource pools 540A-C.

The resource database 511 may be a database containing the current state of the pools of resource such as, for example, the resource pools 540A-C, and those resource pools 540A-C that are currently in use and the fabric connections established. The instances and SLO DB 515 may be a database containing metadata related to one or more composed servers and the SLOs associated to them (if present).

The logging and monitoring service 517 may be an endpoint exporting information on composition fabric traffic and resources utilization. The historical database 513 is a database containing the historical data related to the traffic and performance for each network fabric component and resource utilization of each disaggregated resource.

The network fabric 510 (e.g., network backbone) may include one or more network components such as, for example, the switches 530A-C and wires connecting the resource pools 540A-C to each other. A resource pool (e.g., the resource pools 540A-C) manage a set of disaggregated resources. The disaggregated resources in the resource pools 540A-C can be heterogeneous such as, for example, a memory, compute and accelerators, or homogenous memory.

In operation, as depicted in FIG. 5A, in step 1), a server composition request created and received from a user. The server composition request may include of a list of resource requirements (e.g., compute, memory, accelerators, disks, network, etc.) and required or needed SLOs (e.g., target memory bandwidth request). In step 2) each request is received by the static allocator 514. At step 2a) the static allocator 514 combines historical data, current state of the composition fabric, resources utilization and SLOs (if available) from the resource database 511 and the historical database 513. At step 2b) the static allocator 514 identifies a maximum set of resources (e.g., a best set of resources) that can serve the current request and generates configuration for composition fabric. At step 2c) the static allocator 514) saves a new or additional server configuration to the instances and SLO DB 515 together with associated SLOs, if available. At step 3) the new fabric configuration is forwarded to the connection manager 518 for the setup phase.

Figure 5B:
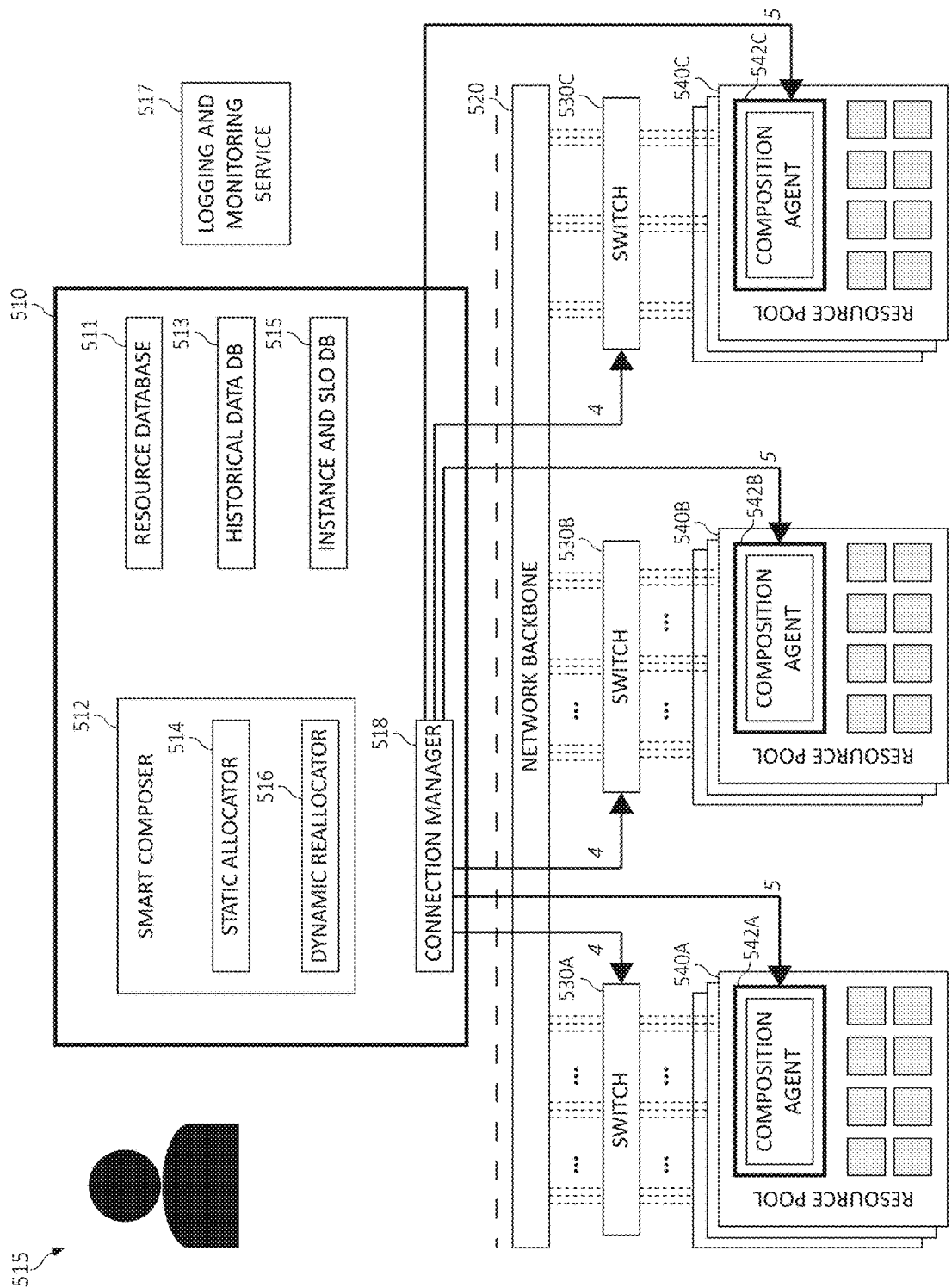

In operation, as depicted in FIG. 5B, in step 4) the connection manager 518 issues configuration commands to all network fabric elements such as, for example, the network 520, the switches 530A, and the resource pools 540A-C needed to establish the connection between components of the resource pools 540A-C. It should be noted that a network fabric link can be exclusive to a server instance or shared between instances, which depends on resources availability (e.g., bandwidth) or instances SLOs (e.g., run in segregation, maximum fabric latency tolerated).

In step 5), the connection manager 518 contacts each composing agent 542A-C locally handling one or more resources of the resource pools 540A-C and sets up the network interfaces via the network 520 for the access to the locally managed resources (e.g., each the resource pools 540A-C). In one aspect, the disaggregated resources of the resource pools 540A-C could be local to a rack, node, or a combination thereof.

Figure 5C:
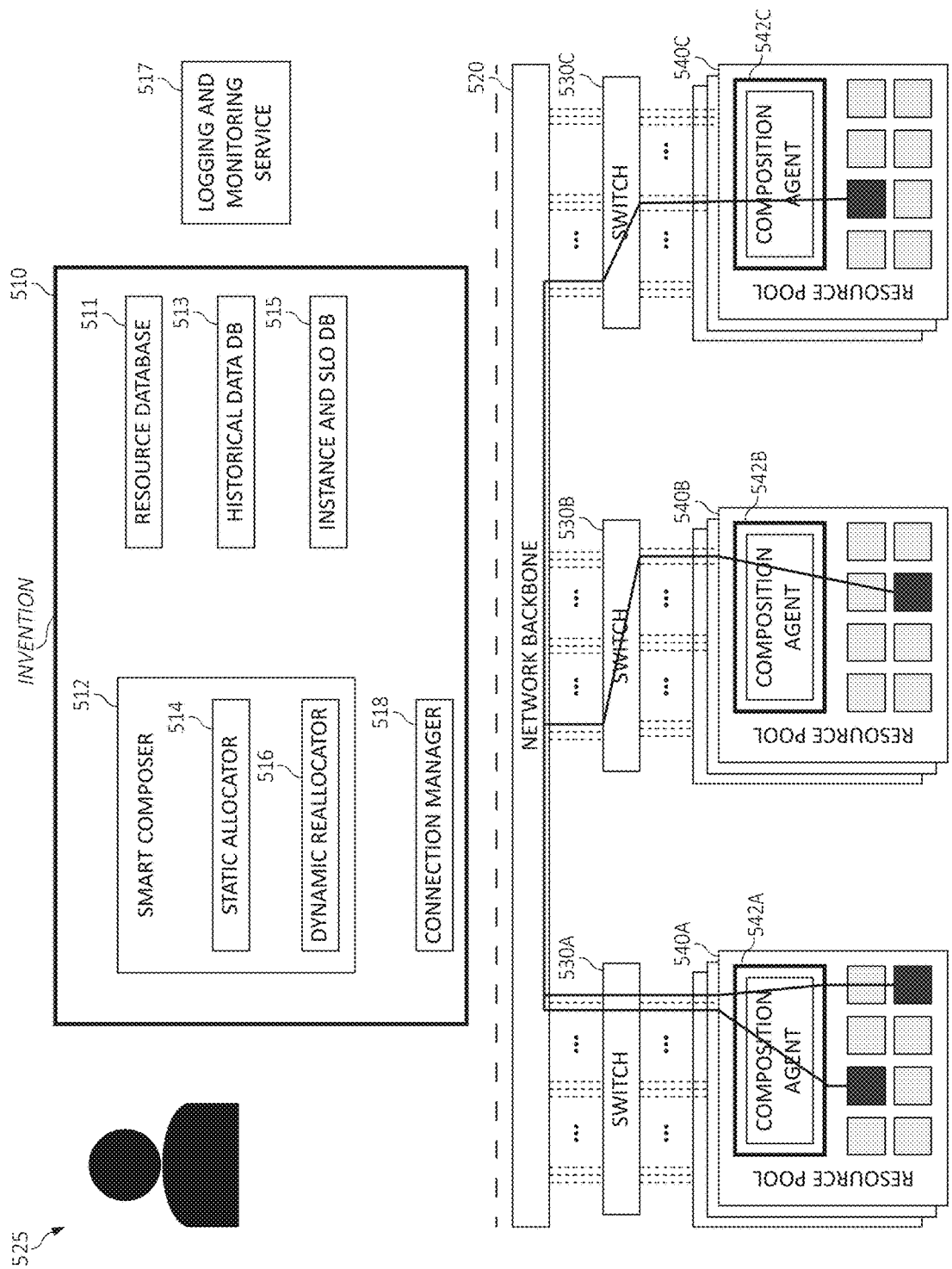

As depicted in FIG. 5C, in step 6) all fabric connections are established via network 520, and the new server instance is successfully composed for one or more of the resources of the resource pools 540A-C. For example, in resource pools 540A two new server instance are connected, in resource pools 540B and 540C a single new server instance is connected.

Figure 5D:
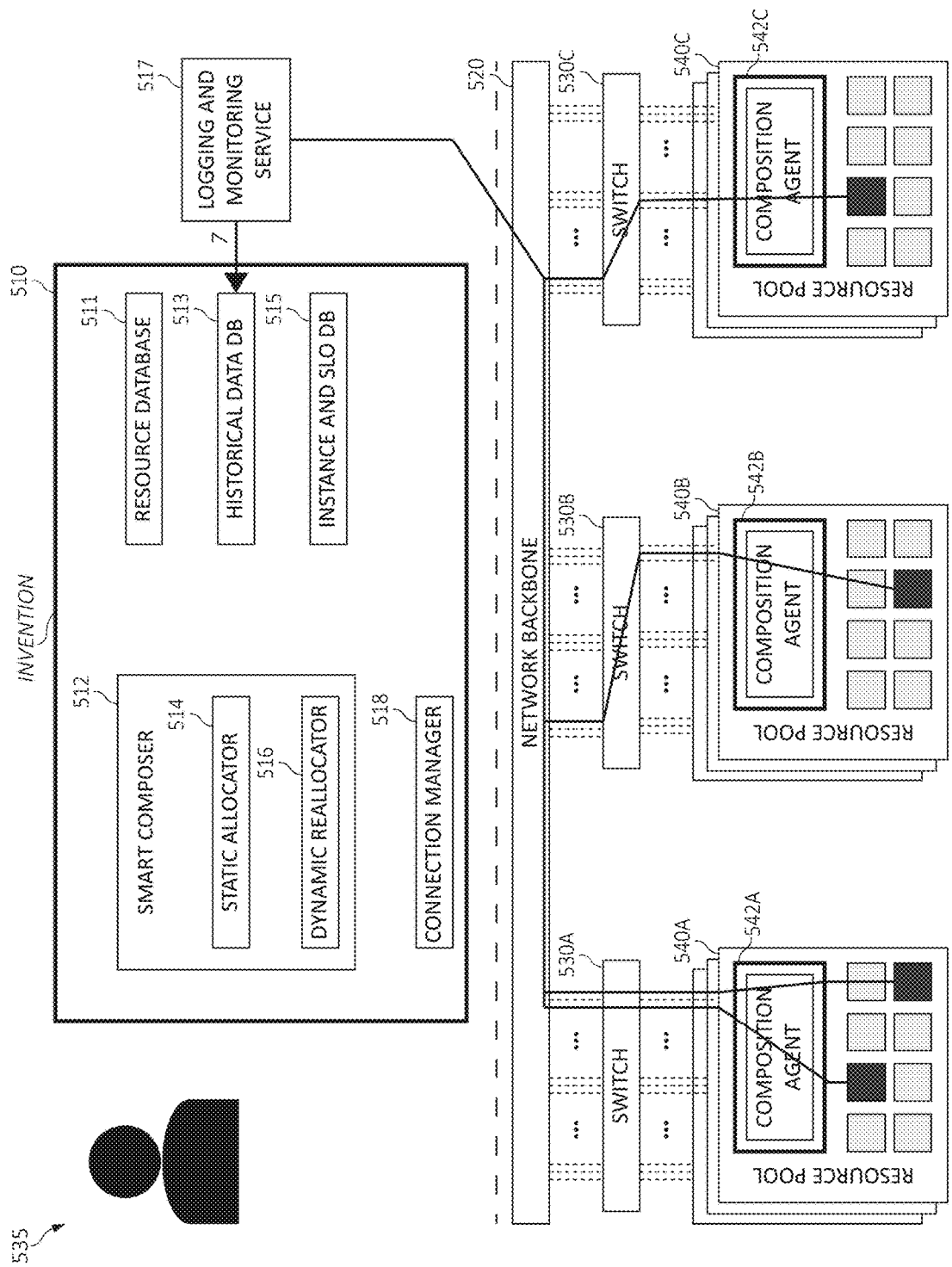

As depicted in FIG. 5D, in step 7) each composable server unit is monitored for utilization and performance by the logging and monitoring service 517 that stores the monitored data in the historical database 513.

Figure 5E:
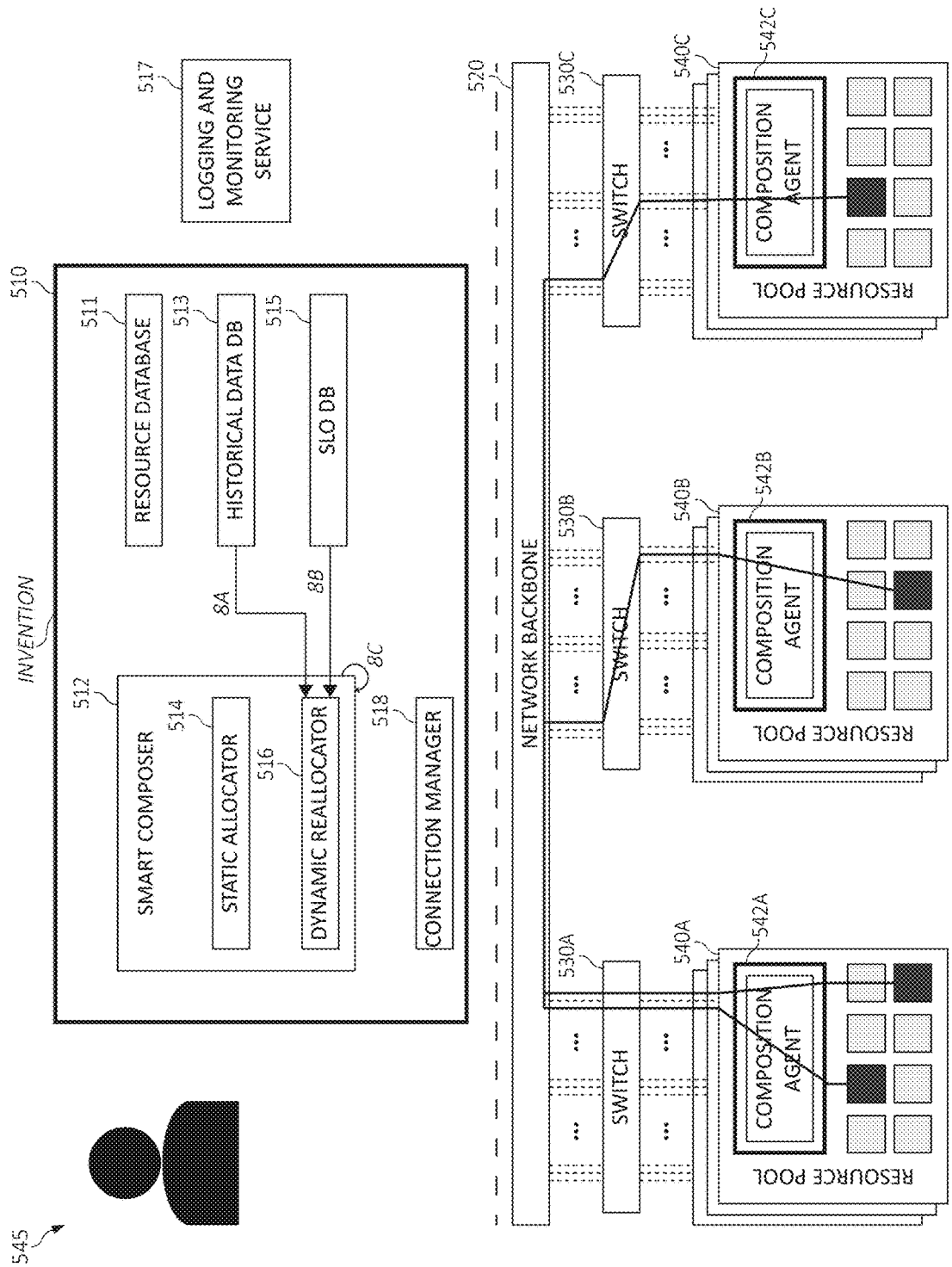

As depicted in FIG. 5E, in step 8a) the dynamic reallocator 516 fetches and retrieves the latest data on resources and fabric utilization. In step 8b) the dynamic reallocator 516 fetches the SLOs for the one of more server controlled. In step 8c) the dynamic reallocator 516 checks the current state for SLOs violations or low resource utilization.

Figure 5F:
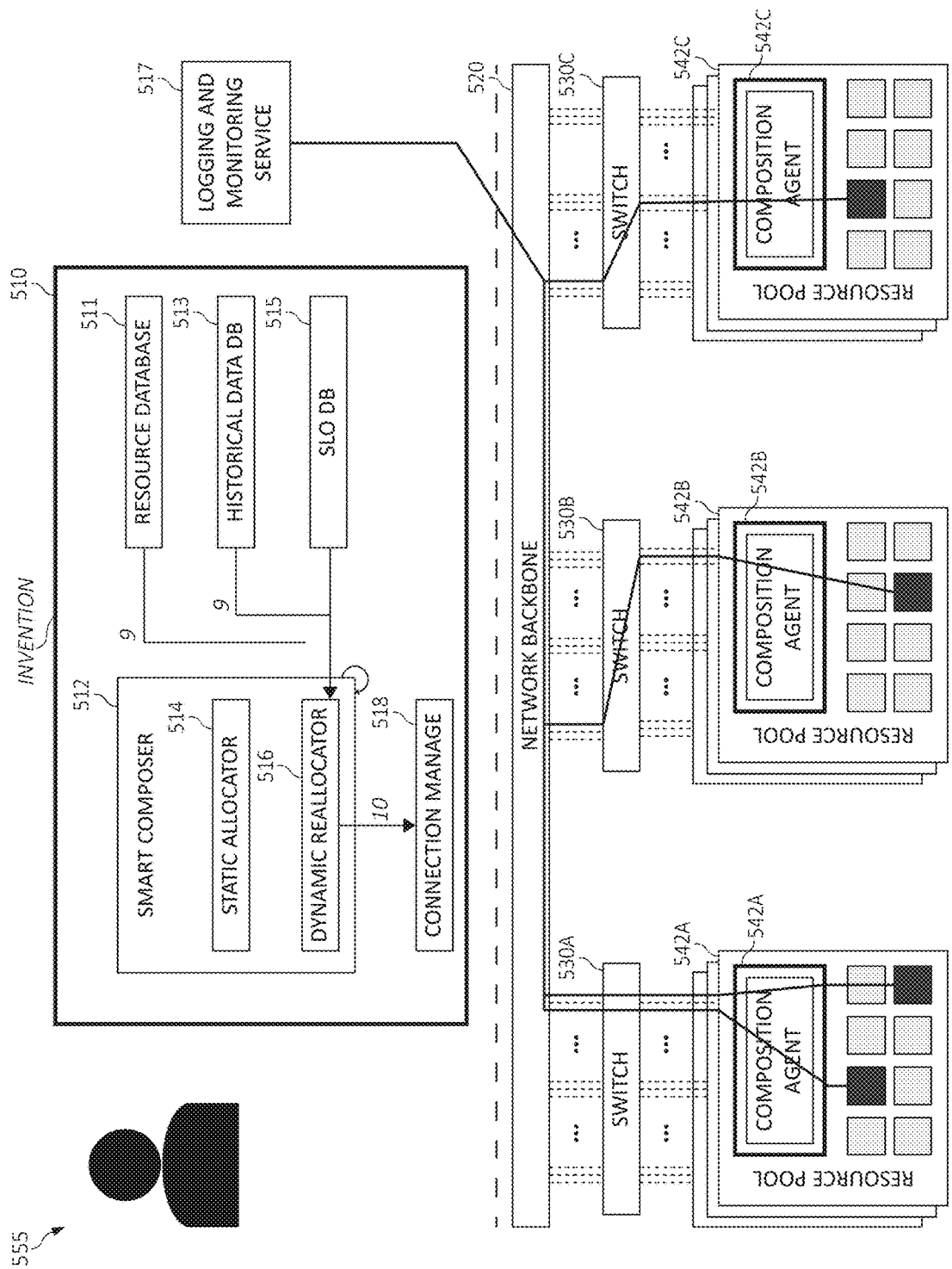

As depicted in FIG. 5F, in step 9) if the composed server requires additional resources, the dynamic reallocator 516 may fetch the resource database and, based on the Historical Data, selects the most suitable instance (Scale-up). If the resources connected to the composed server of the resource pools 540A-C are underutilized, the dynamic reallocator 516 may select a more efficient disaggregated resource (e.g., a most suitable disaggregated resource to detach and scale-down. In step 10) each configuration update is received by the connection manager 518 that takes care of reconfiguring the network fabric to meet a new desired state, as described in steps 4-6.

Figure 6:
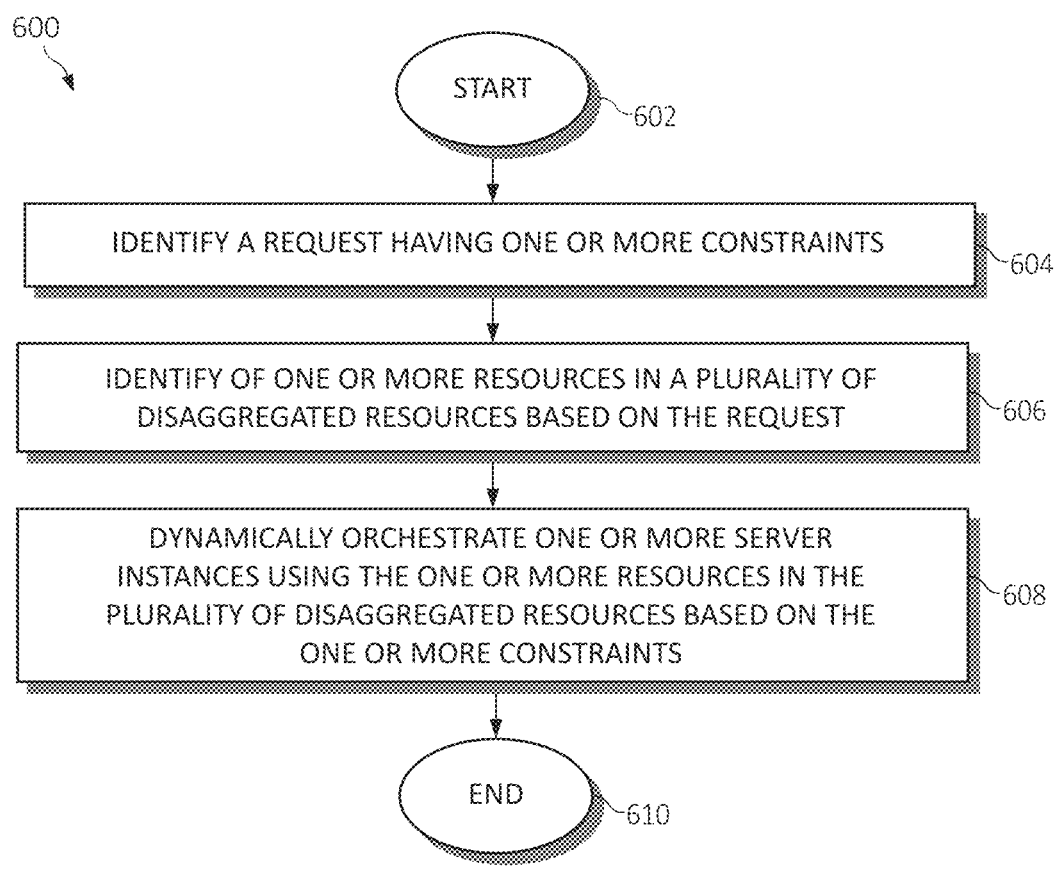
FIG. 6 is a flowchart diagram depicting an exemplary method for dynamic orchestration of disaggregated resource in a computing environment in a computing environment, by a processor, in which aspects of the present invention may be realized.

FIG. 6 is a flowchart diagram depicting an exemplary method for dynamic orchestration of disaggregated resource in a computing environment in a computing environment. In one aspect, each of the devices, components, modules, operations, and/or functions described in FIGS. 1-5 also may apply or perform one or more operations or actions of FIG. 6. The functionality 600 may be implemented as a method executed as instructions on a machine, where the instructions are included on at least one computer readable medium or one non-transitory machine-readable storage medium. The functionality 600 may start in block 602.

One or more constraints in a request may be identified based on a request, as in block 604. One or more resources in a plurality of disaggregated resources may be identified based on the request, as in block 606. One or more server instances using the one or more resources in the plurality of disaggregated resources may be dynamically orchestrated based on the one or more constraints, as in block 608. The method 600 may end, as in block 610.

In one aspect, in conjunction with and/or as part of at least one blocks of FIG. 6, the operations of method 600 may include each of the following. The operations of 600 may recommend the one or more server instances using one or more resources in the plurality of disaggregated resources based on one or more constraints, where the one or more server instances include graphics processing units (GPUs), memory devices, storage systems, and accelerator processor unit (ACUs).

The operations of 600 may initiate a machine learning component to monitor and collect feedback data relating to each of the one or more resources in the plurality of disaggregated resources based on one or more constraints. The operations of 600 may dynamically select alternative server instances using the one or more resources in the plurality of disaggregated resources based on machine learning models. The operations of 600 may configure one or more connections and network components between the plurality of disaggregated resources based on dynamically orchestrating the one or more server instances.

The operations of 600 may identify current resource data and historical resource data of the plurality of disaggregated resources; and dynamically select the one or more server instances using the one or more resources in the plurality of disaggregated resources based on the one or more constraints, the current resource data, and the historical resource data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for increasing disaggregated resources efficiency in a computing environment by one or more processors comprising:
dynamically orchestrating one or more server instances using one or more resources in a plurality of disaggregated resources based on one or more constraints according to a filtering of a graph representing the resources to identify sub-graphs of the resources able to be physically connected while maintaining the one or more constraints, wherein a graph database is used to maintain each of the disaggregated resources as a vertex of the graph, and fabric links between the resources as edges of the graph.

2. The method of claim 1, further including:
identifying a request having the one or more constraints; and
identifying of one or more resources in the plurality of disaggregated resources based on the request.

3. The method of claim 1, further including recommending the one or more server instances using one or more resources in the plurality of disaggregated resources based on one or more constraints, wherein the one or more server instances include graphics processing units (GPUs), memory devices, storage systems, and accelerator processor unit (ACUs).

4. The method of claim 1, further including initiating a machine learning component to monitor and collect feedback data relating to each of the one or more resources in the plurality of disaggregated resources based on one or more constraints.

5. The method of claim 1, further including dynamically selecting alternative server instances using the one or more resources in the plurality of disaggregated resources based on machine learning models.

6. The method of claim 1, further including configuring one or more connections and network components between the plurality of disaggregated resources based on dynamically orchestrating the one or more server instances.

7. The method of claim 1, further including:
identifying current resource data and historical resource data of the plurality of disaggregated resources; and
dynamically selecting the one or more server instances using the one or more resources in the plurality of disaggregated resources based on the one or more constraints, the current resource data, and the historical resource data.

8. A system for increasing disaggregated resources efficiency in a computing environment, comprising:
one or more computers with executable instructions that when executed cause the system to:
dynamically orchestrate one or more server instances using one or more resources in a plurality of disaggregated resources based on one or more constraints according to a filtering of a graph representing the resources to identify sub-graphs of the resources able to be physically connected while maintaining the one or more constraints, wherein a graph database is used to maintain each of the disaggregated resources as a vertex of the graph, and fabric links between the resources as edges of the graph.

9. The system of claim 8, wherein the executable instructions when executed cause the system to:
identify a request having the one or more constraints; and
identify of one or more resources in the plurality of disaggregated resources based on the request.

10. The system of claim 8, wherein the executable instructions when executed cause the system to recommend the one or more server instances using one or more resources in the plurality of disaggregated resources based on one or more constraints, wherein the one or more server instances include graphics processing units (GPUs), memory devices, storage systems, and accelerator processor unit (ACUs).

11. The system of claim 8, wherein the executable instructions when executed cause the system to initiate a machine learning component to monitor and collect feedback data relating to each of the one or more resources in the plurality of disaggregated resources based on one or more constraints.

12. The system of claim 8, wherein the executable instructions when executed cause the system to dynamically select alternative server instances using the one or more resources in the plurality of disaggregated resources based on machine learning models.

13. The system of claim 8, wherein the executable instructions when executed cause the system to configure one or more connections and network components between the plurality of disaggregated resources based on dynamically orchestrating the one or more server instances.

14. The system of claim 8, wherein the executable instructions when executed cause the system to:
identify current resource data and historical resource data of the plurality of disaggregated resources; and
dynamically select the one or more server instances using the one or more resources in the plurality of disaggregated resources based on the one or more constraints, the current resource data, and the historical resource data.

15. A computer program product for increasing disaggregated resources efficiency in a computing environment, the computer program product comprising:
one or more computer readable storage media, and program instructions collectively stored on the one or more computer readable storage media, the program instruction comprising:
program instructions to dynamically orchestrate one or more server instances using one or more resources in a plurality of disaggregated resources based on one or more constraints according to a filtering of a graph representing the resources to identify sub-graphs of the resources able to be physically connected while maintaining the one or more constraints, wherein a graph database is used to maintain each of the disaggregated resources as a vertex of the graph, and fabric links between the resources as edges of the graph.

16. The computer program product of claim 15, further including program instructions to:
identify a request having the one or more constraints; and
identify of one or more resources in the plurality of disaggregated resources based on the request.

17. The computer program product of claim 15, further including program instructions to recommend the one or more server instances using one or more resources in the plurality of disaggregated resources based on one or more constraints, wherein the one or more server instances include graphics processing units (GPUs), memory devices, storage systems, and accelerator processor unit (ACUs).

18. The computer program product of claim 15, further including program instructions to:
initiate a machine learning component to monitor and collect feedback data relating to each of the one or more resources in the plurality of disaggregated resources based on one or more constraints; and
dynamically select alternative server instances using the one or more resources in the plurality of disaggregated resources based on machine learning models.

19. The computer program product of claim 15, further including program instructions to configure one or more connections and network components between the plurality of disaggregated resources based on dynamically orchestrating the one or more server instances.

20. The computer program product of claim 15, further including program instructions to:
identify current resource data and historical resource data of the plurality of disaggregated resources; and
dynamically select the one or more server instances using the one or more resources in the plurality of disaggregated resources based on the one or more constraints, the current resource data, and the historical resource data.

* * * * *